(12) United States Patent
Ishii

(10) Patent No.: US 7,139,587 B2
(45) Date of Patent: Nov. 21, 2006

(54) METHOD AND APPARATUS FOR SYSTEM SELECTION

(75) Inventor: Atsushi Ishii, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 244 days.

(21) Appl. No.: 10/444,184

(22) Filed: May 23, 2003

(65) Prior Publication Data

US 2004/0235475 A1 Nov. 25, 2004

(51) Int. Cl.
H04B 1/38 (2006.01)
H04M 1/00 (2006.01)
H04Q 7/20 (2006.01)

(52) U.S. Cl. .............. 455/552.1; 455/432.1; 455/426.1; 455/435.3

(58) Field of Classification Search ............. 455/435.3, 455/435.2, 440, 433
See application file for complete search history.

(56) References Cited

U.S. PATENT DOCUMENTS

| | | | |
|---|---|---|---|
| 5,442,806 A | 8/1995 | Barber et al. | |
| 5,586,338 A | 12/1996 | Lynch et al. | |
| 5,613,204 A | 3/1997 | Haberman et al. | |
| 5,734,980 A | 3/1998 | Hooper et al. | |
| 5,754,542 A | 5/1998 | Ault et al. | |
| 5,784,693 A | 7/1998 | Barber et al. | |
| 5,790,952 A | 8/1998 | Seazholtz et al. | |
| 5,870,674 A | 2/1999 | English | |
| 5,920,821 A | 7/1999 | Seazholtz et al. | |
| 5,983,092 A | 11/1999 | Whinnett et al. | |
| 6,016,427 A | 1/2000 | Barber et al. | |
| 6,085,085 A | 7/2000 | Blakeney, II et al. | |
| 6,246,875 B1 | 6/2001 | Seazholtz et al. | |
| 6,466,802 B1 * | 10/2002 | Blakeney et al. | 455/552.1 |
| 2002/0102973 A1 * | 8/2002 | Rosenberg | 455/432 |
| 2002/0168976 A1 * | 11/2002 | Krishnan | 455/432 |
| 2003/0054809 A1 * | 3/2003 | Bridges et al. | 455/419 |
| 2004/0198350 A1 * | 10/2004 | Aerrabotu | 455/432.1 |
| 2004/0203745 A1 * | 10/2004 | Cooper | 455/432.1 |

* cited by examiner

Primary Examiner—Lester G. Kincaid
Assistant Examiner—Fred A. Casca
(74) Attorney, Agent, or Firm—Robert D. Varitz, PC

(57) ABSTRACT

In a wireless communication device which is transportable between plural geographic region, wherein each geographic region has preferred and non-preferred communication systems for the wireless communication device, a method of selecting an appropriate communication system, including providing the wireless communication device with a non-PRL system table for storing acquisition parameters, including a communication system identification, a band class designation for a band class, a channel designation for a channel in the band class, and geographic region identification; making entries in the non-PRL system table when the wireless communication device acquire an appropriate channel in a geographic region; searching the non-PRL system table when the wireless communication device next changes geographic regions; and selecting a communication system based on the acquisition parameters in the non-PRL system table as a result of the searching.

6 Claims, 1 Drawing Sheet

METHOD AND APPARATUS FOR SYSTEM SELECTION

FIELD OF THE INVENTION

This invention relates to wireless communication devices, and specifically to a method and apparatus for selecting a preferred communication system in a wireless communication device, such as a cellular phone, capable of operation in a plurality of geographical regions.

BACKGROUND OF THE INVENTION

In a cellular network, such as code division multiple access (CDMA) system, as specified in TIA/EIA/IS-2000, when the user of a subscriber station, e.g., cellular phone, travels from one geographic area to another, the subscriber station must select a communication system upon which to conduct services. The baseline method of selecting a preferred system in a prior art is described in U.S. Pat. No. 6,085,085, as follows: the subscriber station maintains a list of systems, some of which are 'preferred' systems, i.e., systems the subscriber station is allowed to use, and some of which are 'negative' systems, i.e., systems the subscriber station is not allowed to use. The list of systems is referred to as the preferred roaming list (PRL). Associated with each system in the PRL is a system ID (SID), as well as corresponding acquisition parameters (band, channel, etc.). The PRL is created, loaded and updated by the home service provider of the subscriber station.

The PRL is maintained in such a manner that the subscriber station can readily determine which systems (preferred or negative) cover common geographical regions. The references to common geographic regions refers to areas of common radio coverage. Moreover, the systems that cover a common geographical region are prioritized, i.e., ranked from most desirable to least desirable. The subscriber station's job is to attempt to acquire service on the most available desirable system in the subscriber station's current geographical area. There is no point in trying to acquire service on a system outside of the subscriber station's current geographic region, since systems typically provide service only within a limited geographic region.

The subscriber station does not necessarily know where it is when it powers on. Because of roaming, it could be in a different region than it was when it was last powered down. Therefore, it may not be obvious how to acquire any system, let alone the most desirable system. In the prior art, the subscriber station maintains a list of the most recently used (MRU) systems. As a first measure, attempting to acquire one of these systems makes a lot of sense, because there is a good chance that the subscriber station is currently in a recently visited region.

If the subscriber station cannot acquire a MRU system, it can then try to acquire any preferred system in the PRL, using appropriate acquisition parameters. In the prior art, the subscriber station first attempts acquisition on the 'easiest' to acquire systems, e.g., advanced mobile phone system (AMPS), assuming there are any AMPSs in the universal system table. If the subscriber station is unable to acquire one of these systems, then the subscriber station attempts to acquire a system which is 'most representative' of systems in the PRL. In other words, the PRL will probably contain numerous systems which differ only with respect to their SIDs and their geographical regions, but which have identical acquisition parameters, e.g., channel number or frequency block designator.

Once the subscriber station acquires a system, the subscriber station can pick up the acquired system's SID from an overhead message. The subscriber station uses the received SID and the acquisition parameters to determine the geographic region in which it is located. The subscriber station can obtain this geographic information from the PRL, whether the acquired system is preferred or negative.

If the system is a preferred PRL system, and is one of the most desirable systems within its geographical region, the subscriber station provides service using that system. If the system is a PRL system but is not one of the most desirable systems within its geographical region, the subscriber station attempts to acquire a most desirable system in that geographical area, by sequentially making acquisition attempts on systems in the geographic region from most desirable to least desirable for the region.

If the system is not in the PRL, the subscriber station of the prior art attempts acquisition on other systems. The subscriber station may return to this system if the subscriber station fails to acquire a preferred system.

The prior art identified above requires that, if the acquired system is not listed in PRL, the subscriber station attempt to acquire other systems. However, it is quite possible that the subscriber station encounters a number of unknown systems before it is able to determine the geographic region. This case is more likely when roaming to a different geographic area, where the acquisition parameters of the PRL systems available in the roaming region may be quite different from the ones for the MRU systems.

For example, consider the case where a subscriber station, having the PRL table shown in Table 1, travels from Region 1 to Region 3. Table 2 defines the available systems that the subscriber station would encounter in Region 1, as well as in Region 3. When the subscriber station was initially located in Region 1, its MRU table would be as shown in Table 3.

TABLE 1

PRL

| SID | Geographic Region | Preferred/Negative | Band | Channel(s) |
|---|---|---|---|---|
| 30 | Region 1 | Preferred | Cellular | 384, 777 |
| 4117 | Region 1 | Preferred | PCS | 525, 750 |
| 4119 | Region 1 | Preferred | PCS | 425, 450 |
| 25 | Region 1 | Negative | Cellular | 283, 691 |
| 50 | Region 2 | Preferred | Cellular | 384, 777 |
| 2113 | Region 2 | Preferred | PCS | 500, 550, 725 |
| 2155 | Region 2 | Preferred | PCS | 475, 625 |
| 3 | Region 3 | Preferred | Cellular | 283, 691 |
| 4129 | Region 3 | Preferred | PCS | 600, 650 |
| 4157 | Region 3 | Preferred | PCS | 600, 675 |

TABLE 2

Available systems in geographic regions

| Geographic Region | SID | Band | Channel |
|---|---|---|---|
| Region 1 | 30 | Cellular | 384 |
|  | 4119 | PCS | 425 |
| Region 3 | 2 | Cellular | 384 |
|  | 4157 | PCS | 675 |

TABLE 3

MRU table while in Region 1 for PRL System

| SID | Band | Channel |
|---|---|---|
| 30 | Cellular | 384 |
| 4119 | PCS | 425 |

PRIOR ART EXAMPLE

Assume that the subscriber station roams from Region 1 to Region 3: it attempts to find the MRU systems first, by tuning its radio circuit to Band=Cellular (800 MHz Band), Channel=384. Eventually, it will find the system SID=2, in accordance with Table 2. Since this is not a PRL system, the subscriber station attempts to acquire the next entry in the MRU table, which is PCS (1900 MHz band) Channel 425. Unfortunately, there is no system on that channel available in Region 3, which will result in the subscriber station going through all of the channels listed in the PRL, i.e., Cellular band: 283, 384, 691, 777 and PCS band: 425, 450, 475, 500, 525, 550, 600, 625, 650, 725, 750, before finding the available PRL system, SID=4157 on PCS Channel 675.

Scanning for a channel generally requires several seconds, thus, in this example, it may take the subscriber station a couple of minutes before successfully determining its geographic region. Every time the subscriber station again roams to Region 3, it is forced to follow the same procedure as in the example. As a result, it will take a similar amount of time to determine the geographic region, and locate the appropriate channel.

The reason that the subscriber station encounters the excessive search time in the example is because the subscriber station simply disregards the event of acquiring the non-PRL system, SID=2, when first traveling to Region 3. However, when the subscriber station acquired system SID=4157, it could later determine that the non-PRL system is highly likely to be in Region 3. If the subscriber station were capable of "remembering" this information until the next visit to Region 3, it could determine the geographic region immediately when finding the system SID=2, and it would not have to scan all of the channels associated with the other graphical regions. Consequently, the method described in the prior art results in longer acquisition time by losing the valuable information for region determination.

Commercial CDMA handsets and licensed CDMA software products have been examined and observed to all behave in the manner described above.

U.S. Pat. No. 6,246,875 B1, granted Jun. 12, 2001, to Seazholtz et al., for Use of cellular digital packet data (CDPD) communications to convey system identification list data to roaming cellular subscriber stations, describes a method for system selection which relies on the existence of a beacon system.

U.S. Pat. No. 6,085,085, granted Jul. 4, 2000, to Blakeney, II et al. for Method and apparatus for performing preferred system selection, is described above.

U.S. Pat. No. 6,016,427, granted Jan. 18, 2000, to Barber et al., for Preferred carrier selection method, describes a method for system selection which uses a preferred list protocol in place of the earlier conventional A/B system selection algorithm.

U.S. Pat. No. 5,983,092, granted Nov. 9, 1999, to Whinnett et al., for Method and apparatus for system selection, describes use of broadcasted service information, e.g., tariff information, etc., to select preferred systems for a mobile unit.

U.S. Pat. No. 5,920,821, granted Jul. 6, 1999, to Seazholtz et al., for Use of cellular digital packet data (CDPD) communications to convey system identification list data to roaming cellular subscriber stations, describes a method for system selection which relies on the existence of a beacon system.

U.S. Pat. No. 5,870,674, granted Feb. 9, 1999, to English, for Method and apparatus for performing preferred system selection, describes a method for system selection by attempting to acquire representative systems to help determining geographic regions.

U.S. Pat. No. 5,790,952, granted Aug. 4, 1998, to Seazholtz et al., for Beacon system using cellular digital packet data (CDPD) communication for roaming cellular stations describes a method for system selection which relies on the existence of a beacon system.

U.S. Pat. No. 5,784,693, granted Jul. 21, 1998, to Barber et al., for Cellular carrier selection system incorporating a preferred list of system identification codes (SIDs) corresponding to preferred cellular carriers, describes a method for system selection which uses a preferred list protocol in place of the earlier conventional A/B system selection algorithm.

U.S. Pat. No. 5,754,542, granted May 19, 1998, to Ault et al., for Method and apparatus for system determination in a multi-mode subscriber station, describes a method for system selection based on user's preference.

U.S. Pat. No. 5,734,980, granted Mar. 31, 1998, to Hooper et al., for Preferred system selection techniques for mobile terminals, describes a method to select the most preferred system.

U.S. Pat. No. 5,613,204, granted Mar. 18, 1997, to Haberman et al., for Beacon system for roaming cellular stations, describes a method for system selection which uses an existing beacon system.

U.S. Pat. No. 5,586,338, granted Dec. 17, 1996, to Lynch et al., for System identification (SID) list for selecting operating frequencies, describes a method for system selection based on a given priorities for service providers having agreements with a home system provider.

U.S. Pat. No. 5,442,806, granted Aug. 15, 1995, to Barber et al., for Preferred carrier selection method for selecting any available cellular carrier frequency when neither home nor preferred cellular carrier frequencies are available, describes a method for system selection which uses a preferred list protocol in place of the earlier conventional A/B system selection algorithm.

SUMMARY OF THE INVENTION

In a wireless communication device which is transportable between plural geographic region, wherein each geographic region has preferred and non-preferred communication systems for the wireless communication device, a method of selecting an appropriate communication system, including providing the wireless communication device with a non-PRL system table for storing acquisition parameters, including a communication system identification, a band class designation for a band class, a channel designation for a channel in the band class, and geographic region identification; making entries in the non-PRL system table when the wireless communication device acquire an appropriate channel in a geographic region; searching the non-PRL system table when the wireless communication device next changes geographic regions; and selecting a communication system based on the acquisition parameters in the non-PRL system table as a result of the searching.

A communication system selection apparatus for selecting an appropriate communication system for a wireless communication device which is transportable between plural geographic region, wherein each geographic region has preferred and non-preferred communication systems for the wireless communication device, includes a non-PRL system table for storing acquisition parameters, including a communication system identification, a band class designation for a band class, a channel designation for a channel in the band class, and geographic region identification; a non-volatile memory for storing the non-PRL system table, including entries in the non-PRL system table which are made when the wireless communication device acquires an appropriate channel in a geographic region; a search mechanism for interrogating the non-PRL system table when the wireless communication device next changes geographic regions; and a selection mechanism for selecting a communication system based on the acquisition parameters in the non-PRL system table as a result of the interrogation.

It is an object of the present invention to provide a shorter acquisition time for a CDMA-type subscriber station following a change in geographic region.

Another object of the invention is to provide a set of acquisition parameters associated with a geographic region determined when the subscriber station acquires a PRL system, and to store the acquisition parameters in an information record.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENTS

Figure 1:
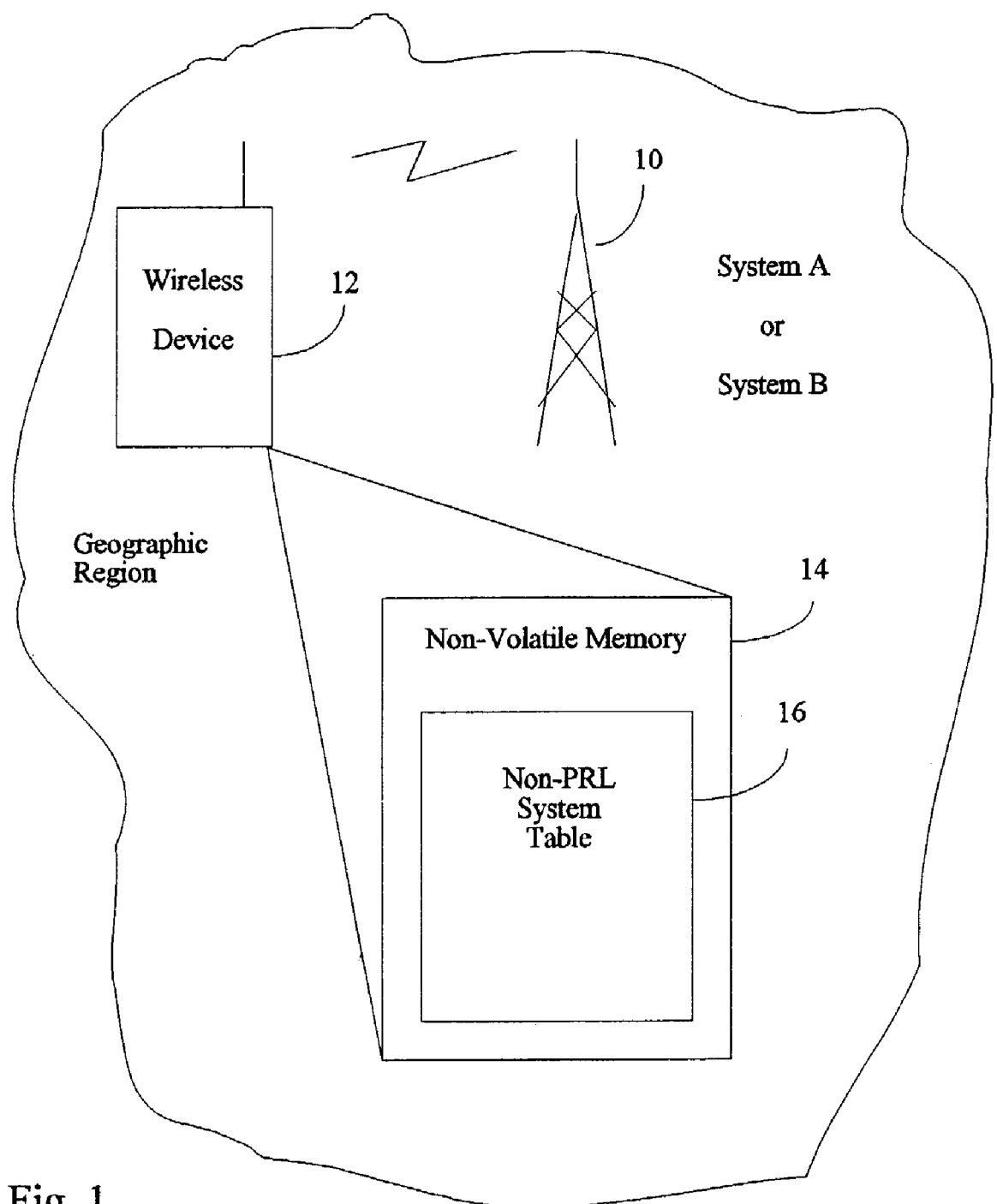
FIG. 1 depicts an embodiment of a CDMA system incorporating the invention.

The present invention is intended to achieve shorter acquisition time by allowing a subscriber station, or wireless communication device, such as a code division multiple access (CDMA) device, which is transportable between many geographic regions, wherein each geographic region has preferred communication systems and non-preferred communications systems, each communication system, regardless of whether preferred or non-preferred, having a communication system identification, to (1) remember a set of acquisition parameters, e.g., communication system station identification (SID), band class designation, channel, and geographic region identification, of an acquired system not listed in the Preferred Roaming List (PRL), also referred to herein as a non-preferred roaming list (non-PRL) system and as an unknown system; (2) associate the set of acquisition parameters with a geographic region, which is determined when the subscriber station acquires a PRL system; (3) form an information record comprising the set of acquisition parameters and the geographic region; (4) store the information record in a non-volatile memory; (5) determine the geographic region when acquiring a non-PRL, or unknown, system whose acquisition parameters match one of the stored information records; and (6) prioritize channels associated with the determined geographic region for scanning.

Referring to FIG. 1, a transmitter 10 is part of a communication system, which may be PRL or non-PRL for a wireless communication device 12 in the specific geographic region. Device 12 includes, along with the usual components, a non-volatile memory 14, which stores a non-PRL system table 16. Non-PRL system table 16 may be a part of a conventional MRU system table, or it may be a separate entity.

In addition to the method described in the prior art, an exemplary embodiment of the present invention allows the subscriber station to maintain a table referred to as a non-PRL System Table, which may be part of a MRU System Table, as illustrated in Table 4.

TABLE 4

Non-PRL System Table

| SID | Band Class | Channel | Geographic Region |
| --- | --- | --- | --- |

Each entry of the non-PRL System Table includes acquisition parameters, comprising SID, band class, channel, and geographic region. The latter element, geographic region, is not included in a conventional MRU System Table for a PRL-based subscriber station. Acquisition parameters may be stored for plural geographic regions in a temporary, non-volatile memory of the wireless communications device. Whenever the subscriber station or wireless communication device acquires a non-PRL system (System-A), it interrogates the system table using a search mechanism in the device to determine if the acquisition parameters of System-A matches any of the entries in the non-PRL system table.

If there is a match, the geographic region in the matched entry is used to select channels associated with all the PRL systems with the same geographic region. The subscriber station then prioritizes those channels for scanning.

If there is no match, then the subscriber station stores the acquisition parameters of System-A in non-volatile memory until it acquires a PRL system (System-B). When a PRL system is successfully acquired, the subscriber station determines its geographic region by the method described in the prior art. It then makes an entry to the non-PRL system table, which entry consists of the determined geographic region and the acquisition parameters of System-A, and then stores the entry in the non-PRL system table. In the case where the subscriber station acquires System-A but fails to acquire System-B, it may discard the acquisition parameters of System-A after a pre-determined amount of time.

Method of the Invention Example

Using the same scenario as in the Prior Art Example, for the first trip to Region 3, the acquisition time may be substantially the same as that using the prior art methodology, however, once the subscriber station acquires an appropriate channel, an entry is made in the non-PRL system table, where SID=2, Band=Cellular, Channel=384, Geographic Region=Region 3 renders a non-PRL system table as:

TABLE 5

Non-PRL System Table

| SID | Band Class | Channel | Geographic Region |
|---|---|---|---|
| 2 | Cellular | 384 | 3 |

For any subsequent visits to Region 3, the subscriber station uses the search mechanism of the invention to acquire a non-PRL system more quickly, because the non-PRL information has been stored in the non-PRL system table. The subscriber station begins searching channels associated with the PRL systems and stored in the MRU system table in the same geographic region. Those channels include only Cellular 283, 691 and PCS 600, 650, 675. Thus, the subscriber station will likely find and select, using a selection mechanism of the invention, the available PRL system SID=4157 much quicker than on the first visit to the region, and much more quickly than would a subscriber station not equipped with the method and system of the invention. It will be appreciated by those of skill in the art that the search and selection mechanisms are programming provided in the circuitry of the wireless communication device incorporating the invention.

A system may cover multiple geographic regions, causing non-PRL system table to have plural entries, wherein more than one entry may contain exactly the same acquisition parameters for different geographic regions. When the subscriber station acquires such a system, it may equally prioritize scanning the channels associated with those geographic regions.

The Non-PRL System Table can be pre-loaded at service provisioning, or can be updated using an over-the-air protocol, such as Over-the-Air Service Provisioning (OTASP), as found in TIA/EIA/IS-683-A. The entries in the table are chosen from available systems in the regions covered by the PRL. In doing so, even in the first visit to a geographic region, the subscriber station is likely to achieve faster acquisition time using the present invention.

Thus, a method and system for selecting a communication system has been disclosed. It will be appreciated that further variations and modifications thereof may be made within the scope of the invention as defined in the appended claims.

I claim:

1. In a wireless communication device which is transportable between plural geographic region, wherein each geographic region has preferred and non-preferred communication systems for the wireless communication device, a method of selecting an appropriate communication system, comprising:

providing the wireless communication device with a non-volatile memory having therein a most recently used table, a roaming list system table, and an unknown system table for storing acquisition parameters of unknown systems when an unknown system is first encountered, including a communication system identification, a band class designation for a band class, a channel designation for a channel in the band class, and geographic region identification wherein the unknown system table is distinct from the most recently used table and the roaming list system table;

making entries in the unknown system table when the wireless communication device first acquires an appropriate channel in a geographic region;

searching the unknown system table when the wireless communication device next changes geographic regions; and selecting a communication system based on the acquisition parameters in the unknown system table as a result of said searching.

2. The method of claim 1 wherein the wireless communication device is a CDMA device.

3. The method of claim 1 wherein the band classes include cellular and PCS.

4. A communication system selection apparatus for selecting an appropriate communication system for a wireless communication device which is transportable between plural geographic region, wherein each geographic region has preferred and communication systems for the wireless communication device, comprising:

a roaming list system table, a most recently used table and an unknown system table for storing acquisition parameters of an unknown system when the unknown system is first encountered, including a communication system identification, a band class designation for a band class, a channel designation for a channel in the band class, and geographic region identification wherein the unknown system table is distinct from the most recently used table and the roaming list system table;

a non-volatile memory for storing said roaming list system table, the MRU table and the unknown system table, including entries in the unknown system table which are made when the wireless communication device first acquires an appropriate channel in a geographic region;

a search mechanism for interrogating said unknown system table when the wireless communication device next changes geographic regions; and a selection mechanism for selecting a communication system based on the acquisition parameters in said unknown system table as a result of the interrogation.

5. The apparatus of claim 4 wherein the wireless communication device is a CDMA device.

6. The apparatus of claim 4 which operates in the cellular and PCS bands.

* * * * *